United States Patent [19]

Larson

[11] 4,202,233
[45] May 13, 1980

[54] SAW GUIDE DEVICE

[76] Inventor: Keith J. Larson, 7108 Palm Dr., Urbandale, Iowa 50322

[21] Appl. No.: 896,805

[22] Filed: Apr. 17, 1978

[51] Int. Cl.² ............................................. B27B 9/04
[52] U.S. Cl. ................................. 83/745; 83/486.1; 83/471.3; 83/574; 83/581; 83/522; 30/376
[58] Field of Search ............. 83/745, 486.1, 471.3, 83/581, 522; 30/373, 376; 33/76 R; 51/170 T

[56] References Cited

U.S. PATENT DOCUMENTS

| | | | |
|---|---|---|---|
| 1,828,043 | 10/1931 | Hedgpeth | 83/740 |
| 2,735,455 | 2/1956 | Forsberg | 83/486.1 |
| 2,942,633 | 6/1960 | King | 83/745 |
| 3,186,452 | 6/1965 | Magnussen | 83/745 |
| 3,875,703 | 4/1975 | Clemente | 51/170 T |
| 3,991,643 | 11/1976 | Girardin | 83/486.1 |

*Primary Examiner*—Donald R. Schran
*Attorney, Agent, or Firm*—Zarley, McKee, Thomte, Voorhees & Sease

[57] ABSTRACT

A saw guide for guiding a hand powered saw to make a straight cut at any predetermined angle, the device including a solid guide bar and a saw base pad, to slidably fit over the guide bar, comprised of a different material than the guide bar itself, with the material selected to reduce sliding friction between the guide bar and the base pad.

5 Claims, 5 Drawing Figures

U.S. Patent
May 13, 1980
4,202,233
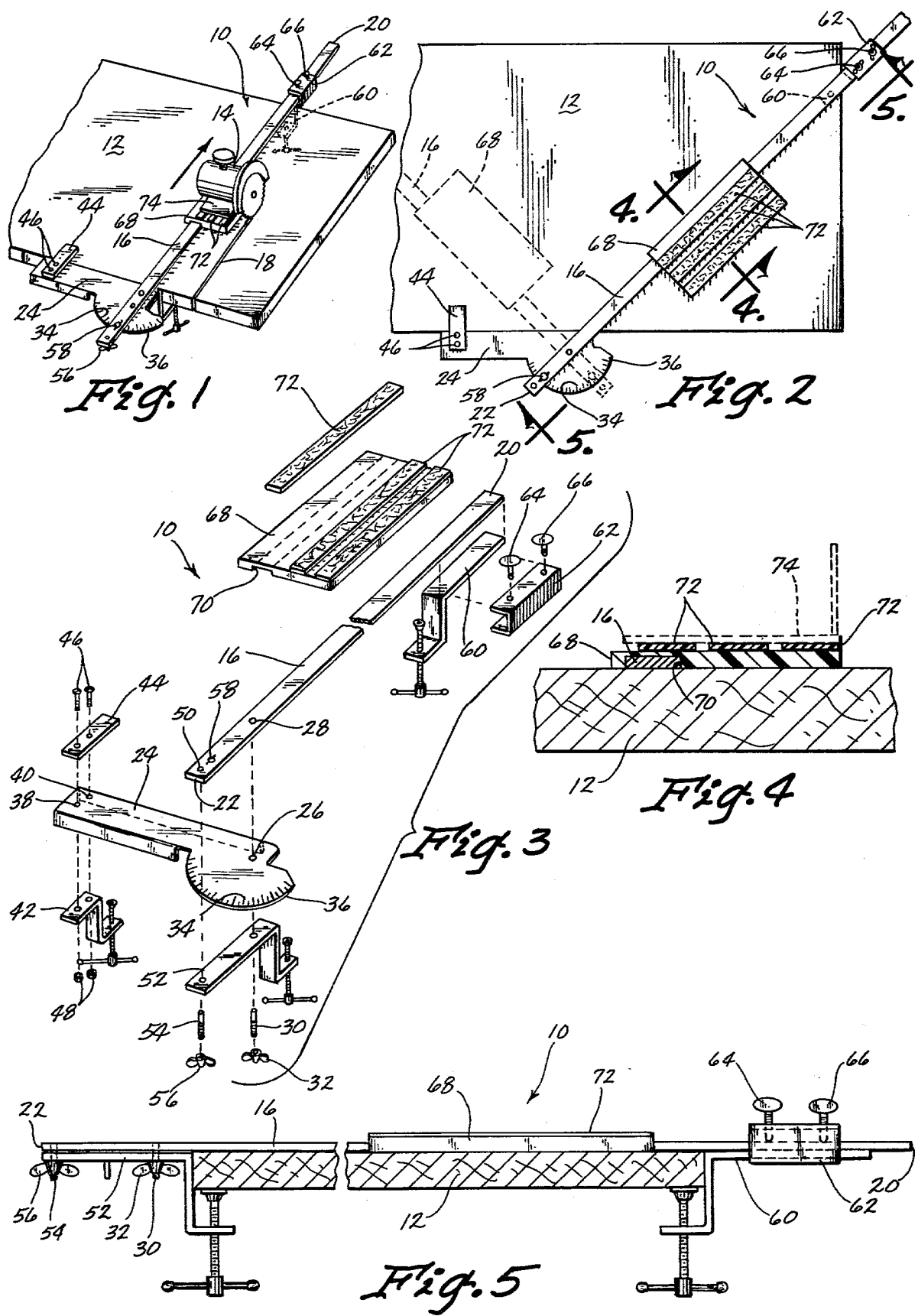

SAW GUIDE DEVICE

BACKGROUND OF THE INVENTION

This invention relates to a saw guide apparatus for hand held power tools, with the apparatus specifically constructed to prevent distortion of the guide bar during use and further designed to employ a saw base pad constructed of a material different than the guide bar which has been specifically selected to reduce sliding friction between the guide bar and the saw base pad.

There have been various types of guide apparatuses for power tools having blades such as circular saws, sabre saws, and to a certain extent, even routers. Typically such units utilize a straight edge guide which is some sort of channel member and a carrier shoe adapted to fit over the channel member and attach to the power saw itself.

While such units have met with some degree of success in the marketplace, most of the units have certain inherent difficulties. Many of those employ very complex mechanical structures which virtually price them out of reach in terms of meeting the consumer demand for such saw guide devices. In addition, many of those which employ a guide bar comprised of a channel shaped U-bracket or the like as the saw guide bar, are subject to easy distortion of the guide bar itself during use. Of course, if the guide bar is distorted, correspondingly any cuts which are made will also be not true since the straightness of the cut is directly dependent upon the true straightness of the guide bar itself. Additionally, many of the prior art structures employ complex carrier shoes which are attached to the base of the power hand tool, with the carrier shoe designed to fit over the guide bar. Such carrier shoes are cumbersome, often complex in structure, and in most instances are made of metal. The result is that the carrier shoe will not smoothly slide along the guide bar and any distortion of the guide bar or the carrier shoe will render the unit virtually useless.

Accordingly, applicant has designed a saw guide which is designed to overcome the above enumerated deficiencies of the prior art devices.

One object of applicant's invention is to provide a saw guide which is very simple in structure, and which can be sold at a very economically low price.

Another object of applicant's invention is to provide a saw guide device which employs a solid steel guide bar which can be conveniently made from cold rolled steel and which is not subject to easy distortion from application of pressure over extended periods of use.

Yet another object of applicant's invention is to provide a saw base pad which is constructed of a material different from the material of the solid saw guide bar with the material selected to reduce sliding friction between the guide bar and the base pad so that the base pad when attached to the power hand tool will allow the tool to easily slide along the guide bar.

Yet another object of applicant's invention is to provide an inexpensive saw base pad which can be attached to a power tool by pressure sensitive adhesive strips.

A still further object of the invention is to provide an inexpensive lightweight guide pad, which can be conveniently adapted for use with a variety of different powered hand tools, including sabre saws, circular saws, routers and the like.

The method and means of accomplishing this invention will become apparent from the following detailed description of the invention.

BRIEF DESCRIPTION OF THE DRAWINGS

FIG. 1 is a perspective view of the apparatus of this invention, with a circular saw attached to the base pad and with the device attached to a work piece.

FIG. 2 is a plan view of the device.

FIG. 3 is an elevated perspective view showing all parts of the device in disassembled condition.

FIG. 4 is an elevated sectional view of the base pad along line 4—4 of FIG. 2.

FIG. 5 is an elevated side view along line 5—5 of FIG. 2.

SUMMARY OF THE INVENTION

The saw guide device of this invention primarily comprises the employment of a solid saw guide bar made of cold rolled steel which is capable of taking some physical abuse without being distorted from its true straightened position and further comprising a saw base pad which is adapted to slidably fit over the guide bar for lengthwise sliding along the guide bar with the base pad being constructed of a material different than the guide bar and selected to reduce sliding friction between the guide bar and the base pad. As a result there is no metal to metal sliding which is a high friction type of movement and there is no basic tendency for the guide bar itself to become distorted during use.

DETAILED DESCRIPTION OF THE INVENTION

The following detailed description of the invention is given in connection with the employment of a circular saw as a powered hand tool, but it is to be understood that other devices such as sabre saws, and routers, may be equally employed with the overall concept of the present invention.

The saw guide device 10 is shown in actual use condition in FIG. 1 mounted to a work piece 12 with a circular saw 14 positioned on guide bar 16 with the saw making a straight cut 18. The device itself is perhaps best illustrated in FIG. 3. Guide bar 14 is comprised of an elongated solid steel bar member having a forward end 20 and a rearward end 22. It is important that guide bar 16 be of solid metal construction. A solid metal guide bar, as opposed to a U-shaped channel member, or a member having an upwardly standing guide flange is important to this invention in that such other types of guide bars as mentioned herein are subject to easy distortion upon application of pressure during use such as they will become distorted from the true position. Moreover, a solid length of steel is the easiest member to employ in that no special performing operations need be conducted.

Guide bar 16 is attached, near its rearward end 22, to anchor plate 24. The attachment of anchor plate 24 to guide bar 16 is by means of a pivot bolt threadably received through the aligned aperture 26 of anchor plate 24 and aligned aperture 28 of guide bar 16. While the term pivotal has been used herein, in FIG. 3 the pivotal fastening means shown is threaded bolt 30 and wing nut 32. It is, however, to be understood that other fastening means which allow pivotal movement of guide bar 16 with respect to anchor plate 24 may also be employed.

At the end of anchor plate 24, which is attached to guide bar 16, anchor plate 24 has a protractor index 34 marked about circular edge 36 in order to allow movement to predetermine angles.

At the end of anchor plate 24 opposite protractor index 34 are apertures 38 and 40 to allow threaded screw clamp 42 and bracket 44 to be attached to anchor plate 26 via conventional screw fasteners 46 and nuts 48. In like manner, at its rearward end, guide bar 16 has aperture 50 which is employed to attach screw clamp 52 via threaded bolt 54 and wing nut 56 to guide bar 16. Sighting aperture 58 is provided to allow sighting of angle markings on protractor index 34.

At or near the forward end 20 of guide bar 22 another screw clamp 60 is associated with bracket 62 and set screws 64 and 66 in order to allow attachment of guide bar 16 to the forward end of work piece 12 as depicted in FIG. 1.

As best seen in FIG. 3, a saw base pad 68 has on its bottom surface elongated notch 70 which is of such a dimension that it will matingly receive guide bar 16 to allow slidable movement of pad 68 along the longitudinal axis of guide bar 16. Positioned on the top surface of base pad 68 are a series of pressure adhesive strips 72. It has been found convenient to utilize for the pressure adhesive strips 72, the pressure adhesive tape material sold by the 3M Company which is used as molding adhesive for cars. The material is pressed against the top surface of pad 68. Positioned over the top surface of the adhesive strip 72 is a paper material which is peeled off when the pad is to be attached to the base 74 (FIG. 1) of circular saw 14.

An important feature of this invention is that base 68 is comprised of a material different than guide bar 16 and that the material is selected to reduce sliding friction between guide bar 16 and base pad 68.

Suitable materials for pad 68 are generally hardened polymeric plastic materials often used as metal bearing materials. Examples of suitable hardened plastic materials from which base 68 can be made are high density polyethylene, nylon, phenolic polymeric materials, polycarbonate polymeric materials, teflon and Delrin. Delrin is an acetal resin, is thermoplastic, as are the other materials mentioned herein, and is manufactured by E. I. duPont de Nemours & Company. Delrin has been utilized for some prototypes and been found highly satisfactory. It is therefore preferred. It is easily available, reduces sliding friction between the guide bar and the base plate 74, and actually runs so smoothly along the longitudinal axis of guides bar 16 that it has the feel during movement as if the movement is bearing supported. It is also important that the hardened thermosetting plastic material be of sufficient rigidity such that it will not easily bend and therefore maintain the integrity of the fixed relationship between the guide 16 and the base pad 68. All of the materials mentioned herein have this capability. It should be understood that there may be other hardenable thermosetting plastic materials which meet the criteria mentioned herein but have not been specifically enumerated, for example, polyvinyl chloride, could perhaps also be employed as well as others.

In actual operation, the saw guide device of this invention works as follows: The edge of anchor plate 24 is placed in abutting relationship with one of the edges of work piece 12 and clamped thereto by screw clamp 42, assuming that wing nuts 32 and 56 are loose, the guide bar 16 is moved to the desired angle as indicated on protractor index 34, sighted through sight aperture 58 and clamped into position by tightening wing nuts 56 and 32. Correspondingly, at the outer end or forward end 20 of guide bar 16 it can be clamped rigidly into position by means of screw clamp 60 and tightening of set screw 64 and 66. Assuming that base plate 68 has been attached to the bottom of circular saw 14, the base plate 60 is then positioned over guide bar 16 so that notch 70 is in mating relationship with guide bar 16. The saw can then be moved freely along longitudinal axis of guide bar 16 with sliding friction reduced to a minimum by employment of the hereinbefore mentioned materials for saw base pad 68. If a unit other than the circular saw is desired for use, other base pads fitting the bottom configuration of the saw base 74, or router base or the like can be employed with equally satisfactory results.

Thus, as can be seen, the invention accomplishes all of its stated objects. It also provides a unit which has a multitude of variable adjustments for the bar itself. In addition, the guide bar itself, being of solid steel construction, is not subject to easy distortion and therefore can be used for extensive periods of time.

Certain advantages of the saw guide device of this system are worthy of specific mention. First, the unit is entirely portable, of simple construction and therefore easy to use. Secondly, the guide bar 16 can be used without using anchor plate 24 in the event that a very narrow board is being cut. Thirdly, the base 68 can be sold as original equipment along with portable hand tools such as a circular saw, sabre saw, or router. Fourthly, the saw itself, because of the simplicity of construction of the base pad, can be used without the guide, with the base pad attached and it will not interfere with the making of a cut. Lastly, and as previously mentioned, the guide bar is releaseably attached to the overall device so that it can be easily removed and a guide bar of differing length substituted therefor.

What is claimed is:

1. A tool guide comprising in combination,
a saw guide bar which is solid and rectangular in cross-section for extension across a work piece, said bar having a forward end and a rearward end,
an anchor plate attached near said rearward end of said guide bar to allow pivotal movement of said guide bar with respect to said plate;
clamping means on said plate to clamp said plate to a work piece, and to releaseably clamp said guide bar to predetermined fixed positions with respect to said anchor plate; and
a tool base pad having a groove therein adapted to slidably fit over said guide bar for lengthwise sliding along said bar and which can be lifted upwardly and off of said bar, said base pad being constructed of a material different than said guide bar and selected to reduce sliding friction between said guide bar and said base pad, and
pressure sensitive adhesive strip means on said pad to attach a powered hand tool thereto without altering the structural elements of such hand tool.

2. The saw guide of claim 1 wherein said guide bar is an elongated solid bar of cold, rolled steel.

3. The saw guide of claim 1 wherein said base pad is a solid, polymeric hardened, thermosetting plastic material which reduces sliding friction between said base pad and said guide bar.

4. The saw guide of claim 3 wherein said base pad is comprised of a hardened plastic material selected from the group consisting of acetal resins, high density polyethylene, nylon, phenolic resins, polycarbonate resins and tetraflorethylene.

5. The saw guide of claim 1 wherein said anchor plate has a protractor index marked thereon to determine the angle of said guide bar.

* * * * *